United States Patent
Ruona et al.

(10) Patent No.: US 9,371,790 B2
(45) Date of Patent: Jun. 21, 2016

(54) METHODS AND SYSTEMS FOR CONTROLLING FUEL INJECTION

(75) Inventors: William Charles Ruona, Farmington Hills, MI (US); Fred Howard Trinker, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 782 days.

(21) Appl. No.: 13/354,224

(22) Filed: Jan. 19, 2012

(65) Prior Publication Data

US 2012/0143477 A1    Jun. 7, 2012

(51) Int. Cl.
*F02D 41/40* (2006.01)
*F02D 41/06* (2006.01)
*F02D 35/02* (2006.01)
*F02D 41/36* (2006.01)

(52) U.S. Cl.
CPC ............ *F02D 41/065* (2013.01); *F02D 35/024* (2013.01); *F02D 41/40* (2013.01); *F02D 41/401* (2013.01); *F02D 41/365* (2013.01); *F02D 2200/0602* (2013.01); *Y02T 10/44* (2013.01)

(58) Field of Classification Search
CPC ............... F02D 41/065; F02D 41/40–41/405; F02D 41/3076; F02D 41/365; F02D 41/06–41/067; F02D 35/024; F02D 35/023
USPC .......... 123/299, 305, 435, 677, 678, 685, 686, 123/689, 478, 491; 701/103, 104, 105, 113
See application file for complete search history.

(56) References Cited

U.S. PATENT DOCUMENTS

| | | | | |
|---|---|---|---|---|
| 4,723,523 A | * | 2/1988 | Kataoka | F02D 41/065 123/491 |
| 4,747,386 A | * | 5/1988 | Onishi | 123/491 |
| 4,867,115 A | * | 9/1989 | Henein | F02D 35/023 123/179.17 |
| 5,184,589 A | * | 2/1993 | Nonaka | F02B 61/045 123/352 |
| 5,193,505 A | * | 3/1993 | Straubel | F02M 59/447 123/179.17 |
| 5,231,962 A | * | 8/1993 | Osuka | F02D 41/062 123/179.16 |
| 5,579,739 A | * | 12/1996 | Tuckey | F02D 33/003 123/463 |
| 5,718,203 A | * | 2/1998 | Shimada et al. | 123/305 |
| 5,785,031 A | * | 7/1998 | Akimoto | F02B 23/00 123/295 |

(Continued)

FOREIGN PATENT DOCUMENTS

| | | | | |
|---|---|---|---|---|
| JP | H10103177 A | * | 4/1998 | F02M 37/00 |
| JP | 2005098118 A | * | 4/2005 | F02D 41/06 |

(Continued)

*Primary Examiner* — Stephen K Cronin
*Assistant Examiner* — Brian Kirby
(74) *Attorney, Agent, or Firm* — Julia Voutyras; Alleman Hall McCoy Russell & Tuttle LLP

(57) ABSTRACT

Various systems and methods are provided for controlling fuel injection to an engine. In one example, fuel injection timing of a cylinder of the engine is adjusted during a hot engine restart such that a fuel injector is open only when the cylinder pressure is greater than a threshold cylinder pressure. The threshold cylinder pressure may be adjusted responsive to a fuel rail pressure.

21 Claims, 7 Drawing Sheets

(56) References Cited

U.S. PATENT DOCUMENTS

| | | | | |
|---|---|---|---|---|
| 5,881,694 A * | 3/1999 | Nakada | | 123/305 |
| 5,941,209 A * | 8/1999 | Hashimoto | | F02D 37/02 123/295 |
| 5,950,598 A * | 9/1999 | Wenzlawski | | F02D 35/023 123/435 |
| 5,967,113 A * | 10/1999 | Kaneko | | F02B 17/005 123/295 |
| 5,979,400 A * | 11/1999 | Nishide | | F02D 35/023 123/294 |
| 6,216,664 B1 * | 4/2001 | Bochum | | F02B 17/005 123/305 |
| 6,318,074 B1 * | 11/2001 | Nishimura | | F02D 41/024 60/284 |
| 6,516,781 B2 * | 2/2003 | Weisman | | 123/435 |
| 6,708,661 B1 * | 3/2004 | Aubourg | | F02D 41/062 123/179.16 |
| 6,725,835 B2 * | 4/2004 | Joos | | F02D 37/02 123/406.53 |
| 6,837,231 B1 * | 1/2005 | Herrin | | F02D 41/0002 123/684 |
| 6,986,331 B2 * | 1/2006 | Mizutani | | F02D 11/105 123/179.15 |
| 7,000,600 B1 * | 2/2006 | Yamada et al. | | 123/501 |
| 7,044,105 B2 * | 5/2006 | Grass | | F02D 41/065 123/305 |
| 7,150,262 B2 * | 12/2006 | Demura | | F02D 35/023 123/305 |
| 7,159,568 B1 * | 1/2007 | Lewis | | F02D 19/084 123/299 |
| 7,234,440 B2 * | 6/2007 | Hilditch | | F02D 41/0255 123/299 |
| 7,246,605 B2 * | 7/2007 | Nazarov et al. | | 123/501 |
| 7,331,333 B2 * | 2/2008 | Maitani | | F02D 41/064 123/179.17 |
| 7,418,337 B2 * | 8/2008 | Toyohara | | F02D 41/3836 123/478 |
| 7,520,265 B2 * | 4/2009 | Ishizuka | | 123/435 |
| 7,527,028 B2 * | 5/2009 | Leone | | B60W 10/06 123/348 |
| 7,536,996 B2 * | 5/2009 | Nagai | | 123/435 |
| 7,574,299 B2 * | 8/2009 | Shinohara et al. | | 701/104 |
| 7,594,493 B2 * | 9/2009 | Matekunas et al. | | 123/299 |
| 7,610,143 B1 * | 10/2009 | Boesch | | B60K 6/365 701/112 |
| 8,095,294 B1 * | 1/2012 | Griffiths et al. | | 701/103 |
| 8,150,600 B2 * | 4/2012 | Ishizuka | | F02D 41/40 123/435 |
| 8,437,942 B2 * | 5/2013 | Nakata et al. | | 701/103 |
| 8,899,211 B2 * | 12/2014 | Aso | | F02D 41/047 123/179.16 |
| 2001/0027643 A1 * | 10/2001 | Tokuyasu | | F02B 17/005 60/284 |
| 2003/0217732 A1 * | 11/2003 | Kataoka | | F02B 1/12 123/276 |
| 2005/0039726 A1 * | 2/2005 | Ishii | | F02D 41/062 123/491 |
| 2005/0155568 A1 * | 7/2005 | Maitani | | F02D 41/064 123/295 |
| 2005/0197761 A1 * | 9/2005 | Bidner | | F02P 5/045 701/105 |
| 2005/0279322 A1 * | 12/2005 | Kufferath | | F02D 35/024 123/299 |
| 2007/0028890 A1 * | 2/2007 | Brown et al. | | 123/299 |
| 2007/0068485 A1 * | 3/2007 | Hilditch | | F02D 41/0255 123/299 |
| 2008/0236548 A1 * | 10/2008 | Iihoshi et al. | | 123/475 |
| 2009/0084348 A1 * | 4/2009 | Batenburg et al. | | 123/294 |
| 2009/0271095 A1 * | 10/2009 | Kojima | | F02N 11/0814 701/113 |
| 2011/0048393 A1 * | 3/2011 | Akita | | F02D 41/0032 123/704 |
| 2012/0130622 A1 * | 5/2012 | Yamada | | 701/104 |

FOREIGN PATENT DOCUMENTS

| | | | | |
|---|---|---|---|---|
| JP | 2008098118 A | * | 4/2005 | Y02T 10/125 |
| JP | 2005171821 A | * | 6/2005 | Y02B 10/44 |

* cited by examiner

METHODS AND SYSTEMS FOR CONTROLLING FUEL INJECTION

TECHNICAL FIELD

The present application relates to methods and systems for controlling the injection timing and pulsewidth of fuel in an internal combustion engine.

BACKGROUND AND SUMMARY

Direct injection of fuel in which fuel is delivered directly into a combustion chamber of an engine may be employed to deliver fuel to an engine. The fuel injector may receive high pressure fuel from a rail pressurized by a high pressure fuel pump. Direct injection may enable flexibility in the timing of fuel delivery into the cylinder depending on operation conditions.

The inventors herein have recognized during hot engine restarts, a higher than requested fuel flow may be delivered to the engine due to the high pressure in the fuel rail from the high temperature fuel, along with minimum opening times of the injector. As such, air-fuel ratio may be not maintained at a desired level due to the increased amount of fuel delivered to the engine. As a result, efficient emission control may be reduced, as emissions from the engine may increase.

Thus in one example, the above issues may be at least partially addressed by a method for an engine. One example method comprises, during a hot engine restart, adjusting fuel injection timing into an engine cylinder such that for an entire duration a fuel injector is open, cylinder pressure is greater than a threshold cylinder pressure. In this way, it is possible to take advantage of the compression generated by the piston during the compression stroke to counteract the effects of the minimum opening time of the injector.

In one example, the threshold cylinder pressure may increase with an increase in a fuel rail pressure. As such, fuel injection opening and closing timings may be retarded as compared to a cold start condition or a hot restart condition where injection timing is not modified significantly based on cylinder pressure. By retarding fuel injection to a condition when the cylinder pressure is greater, the higher cylinder pressure increases a fuel pulsewidth needed to achieve a desired amount of injected fuel for a given rail pressure. In this manner, the fuel pulsewidth may be more easily modified in response to air-fuel ratio demands for emission control, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to various embodiments of methods and systems for controlling fuel injection to an engine. In one example method for operating an engine, during a hot engine restart, fuel injection timing of a cylinder of the engine is adjusted such that for an entire duration a fuel injector is open, cylinder pressure is greater than a threshold cylinder pressure. In such an example, opening and closing timings of a fuel injector may each be retarded so that fuel is injected at a later time when the cylinder pressure is greater. For example, the threshold cylinder pressure may be adjusted responsive to fuel rail pressure such that the threshold cylinder pressure increases with an increased fuel rail pressure. When fuel is injected at a higher cylinder pressure when the difference between the cylinder pressure and the fuel rail pressure is smaller, the flow rate of fuel to the cylinder decreases and the fuel injector has to remain open longer to deliver a desired amount of fuel to the cylinder. As such, there is a smaller chance of delivering a higher than requested amount of fuel to the cylinder during a hot engine restart, and a desired air-fuel ratio may be maintained. The hot engine restart may comprise an engine start from rest shortly following previous engine operation such that the engine temperature is raised above a threshold, and raised relative to ambient temperature. In contrast, a cold engine start may comprise an engine start from rest in which the engine has cooled to ambient temperature, for example below the threshold temperature. Various alternative approaches may also be used to identify cold engine starts or hot restarts, such as engine coolant temperature, engine cylinder block temperature, and various others.

Figure 1:
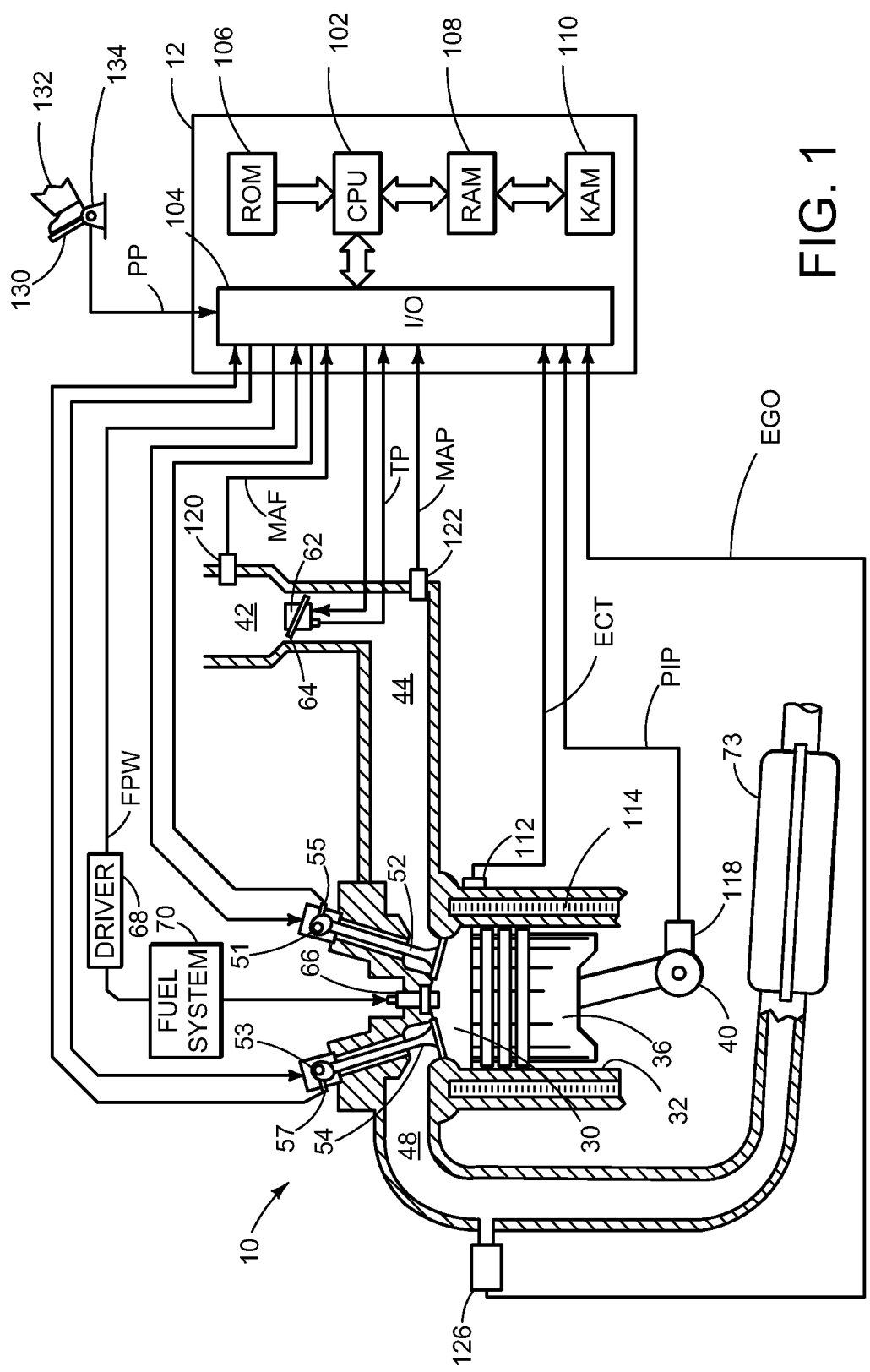
FIG. 1 shows a schematic diagram of an engine.

FIG. 1 is a schematic diagram showing an example embodiment of one cylinder of multi-cylinder engine 10, which may be included in a propulsion system of an automobile. Engine 10 is controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 includes combustion chamber walls 32 with piston 36 positioned therein. As depicted, piston 36 is coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

As shown in the example of FIG. 1, combustion chamber 30 receives intake air from intake manifold 44 via intake passage 42 and exhausts combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 are controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The positions of intake valve 52 and exhaust valve 54 are determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Further, fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber (as shown in FIG. 1), for example. Fuel may be delivered to fuel injector 66 by fuel system 70 including a fuel tank, a fuel pump, and a fuel rail, as will be described in greater detail below with reference to FIG. 2. In some embodiments, combustion chamber 30 may alternatively or additionally include a fuel injector arranged in intake manifold 44 in a configuration that provides what is known as port injection of fuel into the intake port upstream of combustion chamber 30.

As shown in FIG. 1, intake passage 42 includes a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 is provided to controller 12 by throttle position signal TP, for example. Intake passage 42 further includes a mass air flow sensor 120 and a manifold air pressure sensor 122 for providing respective signals MAF and MAP to controller 12.

In some embodiments, combustion chamber 30 or one or more other combustion chambers of engine 10 may be operated in a compression ignition mode, with or without an ignition spark. In other examples, engine 10 may additionally or alternatively include an ignition system which provides an ignition spark to combustion chamber 30 via a spark plug in response to a spark advance signal received from controller 12, under select operating modes.

Exhaust gas sensor 126 is shown coupled to exhaust passage 48 upstream of emission control device 73. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 73 is shown arranged along exhaust passage 48 downstream of exhaust gas sensor 126. Device 73 may be a three way catalyst (TWC), NOx trap, various other emission control devices, or combinations thereof. In some embodiments, during operation of engine 10, emission control device 73 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor may give an indication of engine torque, for example. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine; it should be understood that each cylinder may similarly include its own set of intake/exhaust valves, fuel injector, spark plug, etc.

Figure 2:
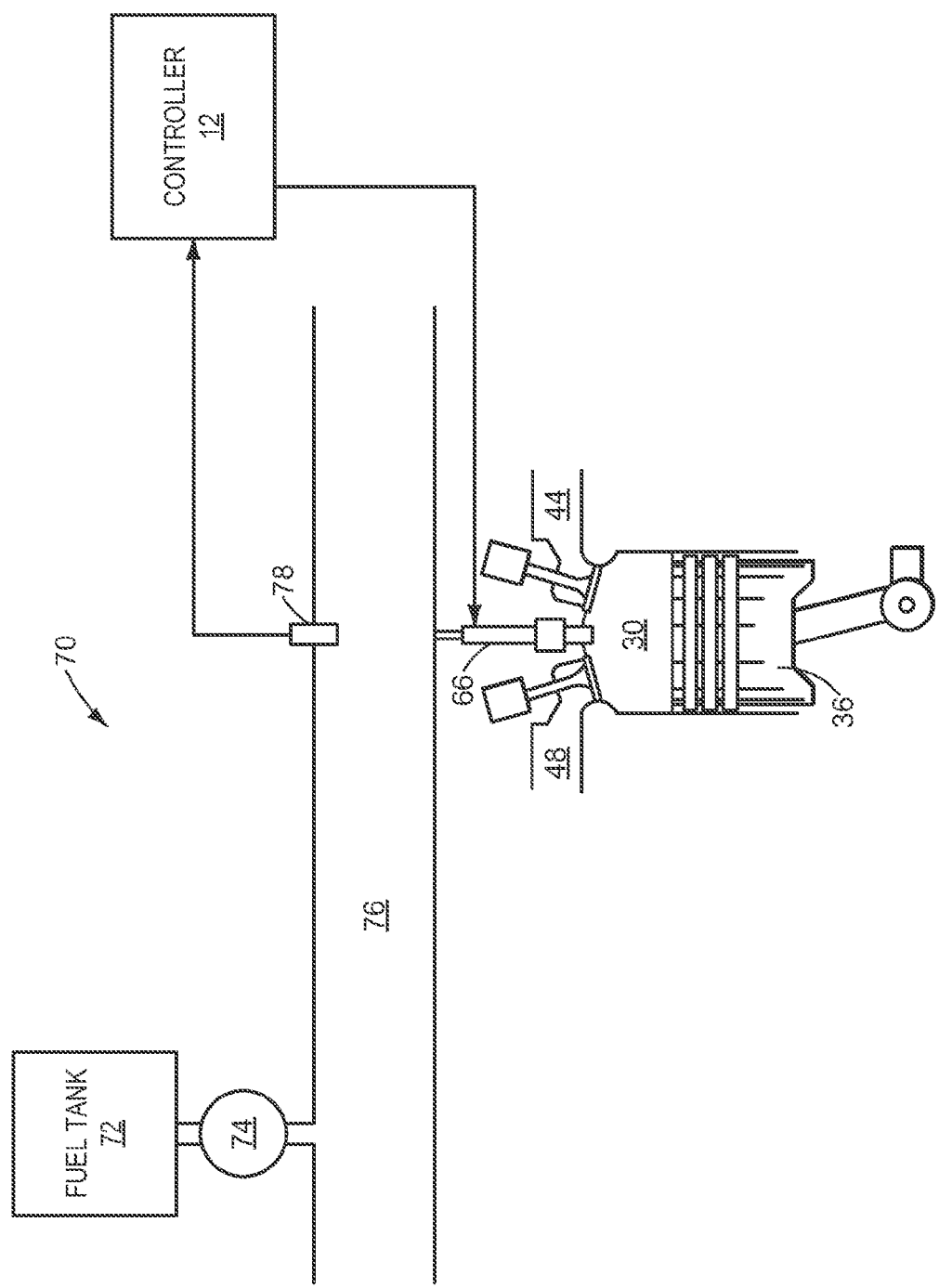
FIG. 2 shows a schematic diagram of a cylinder of an engine coupled to a fuel system.

FIG. 2 shows another example embodiment of a cylinder, such as combustion chamber 30 of engine 10 described above with reference to FIG. 1. As shown in FIG. 2, combustion chamber 30 is fluidically coupled to fuel system 70. FIGS. 1 and 2 include like parts, and as such, are labeled with like reference numerals and some of the parts may not be described in detail again.

As depicted in FIG. 2, fuel system 70 includes fuel tank 72, fuel pump 74, and fuel rail 76. Fuel tank 72 holds a suitable fuel for combustion which is supplied to combustion chamber 30. As an example, fuel tank 72 may hold diesel fuel. In other examples, fuel tank 72 may hold gasoline or an alcohol containing fuel blend, such as E85 (which is approximately 85% ethanol and 15% gasoline) or M85 (which is approximately 85% methanol and 15% gasoline).

Pump 74 may be a high pressure pump which supplies fuel rail 76 with high pressure fuel. Fuel rail 76 may be a high pressure accumulator, for example, which stores the fuel at high pressure until it is delivered to combustion chamber 30. Fuel system 70 further includes a pressure sensor 78 in communication with controller 12, and configured to send a signal indicating fuel rail pressure to controller 12. Pressure sensor 78 may be any suitable sensor for measuring pressure. In some examples, more than one pressure sensor may be disposed in the fuel rail at a plurality of locations. As one example, each fuel injector may have a corresponding pressure sensor. As shown in FIG. 2, fuel is injected directly into a top portion of combustion chamber 30 from fuel rail 76 via fuel injector 66. In the example shown in FIG. 2, fuel injector 66 is actuated by controller 12. For example, fuel injector may be operated by a solenoid that is controlled by controller 12.

Figure 3:
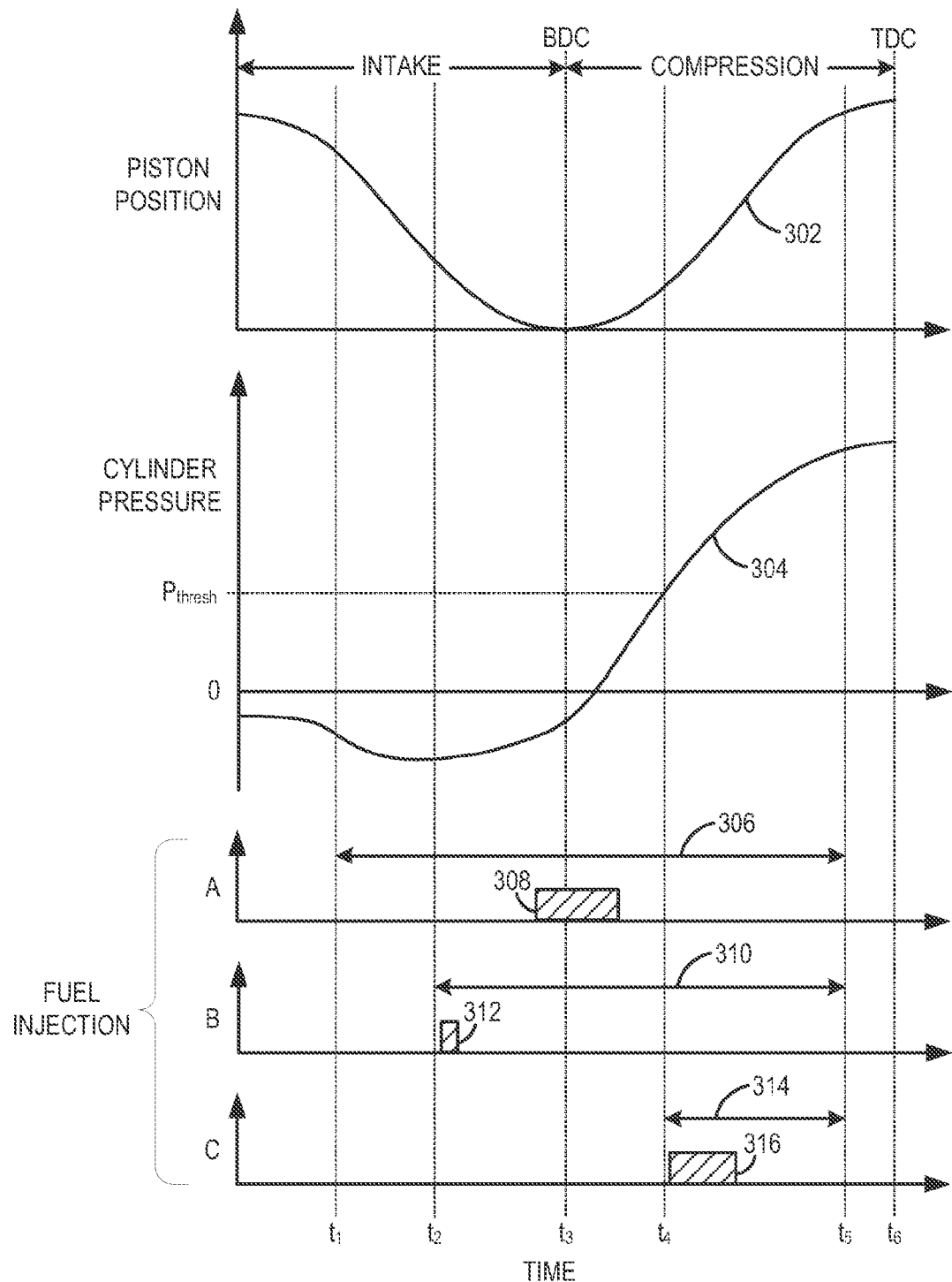
FIG. 3 shows timing charts illustrating fuel injection with respect to cylinder pressure and piston position.
Figure 4:
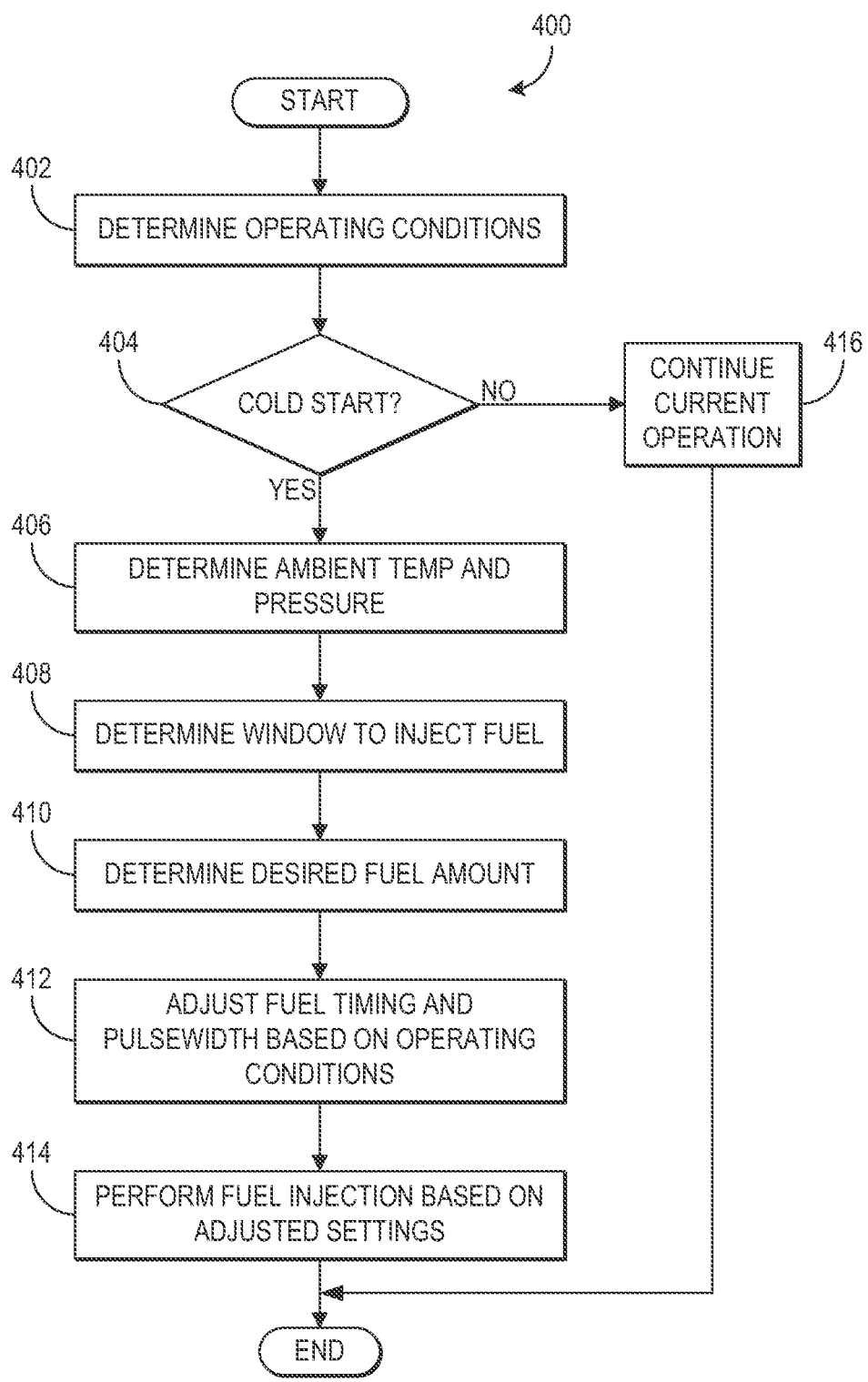
FIG. 4 shows a flow chart illustrating a routine for controlling a fuel injection to an engine during a cold engine start.
Figure 5:
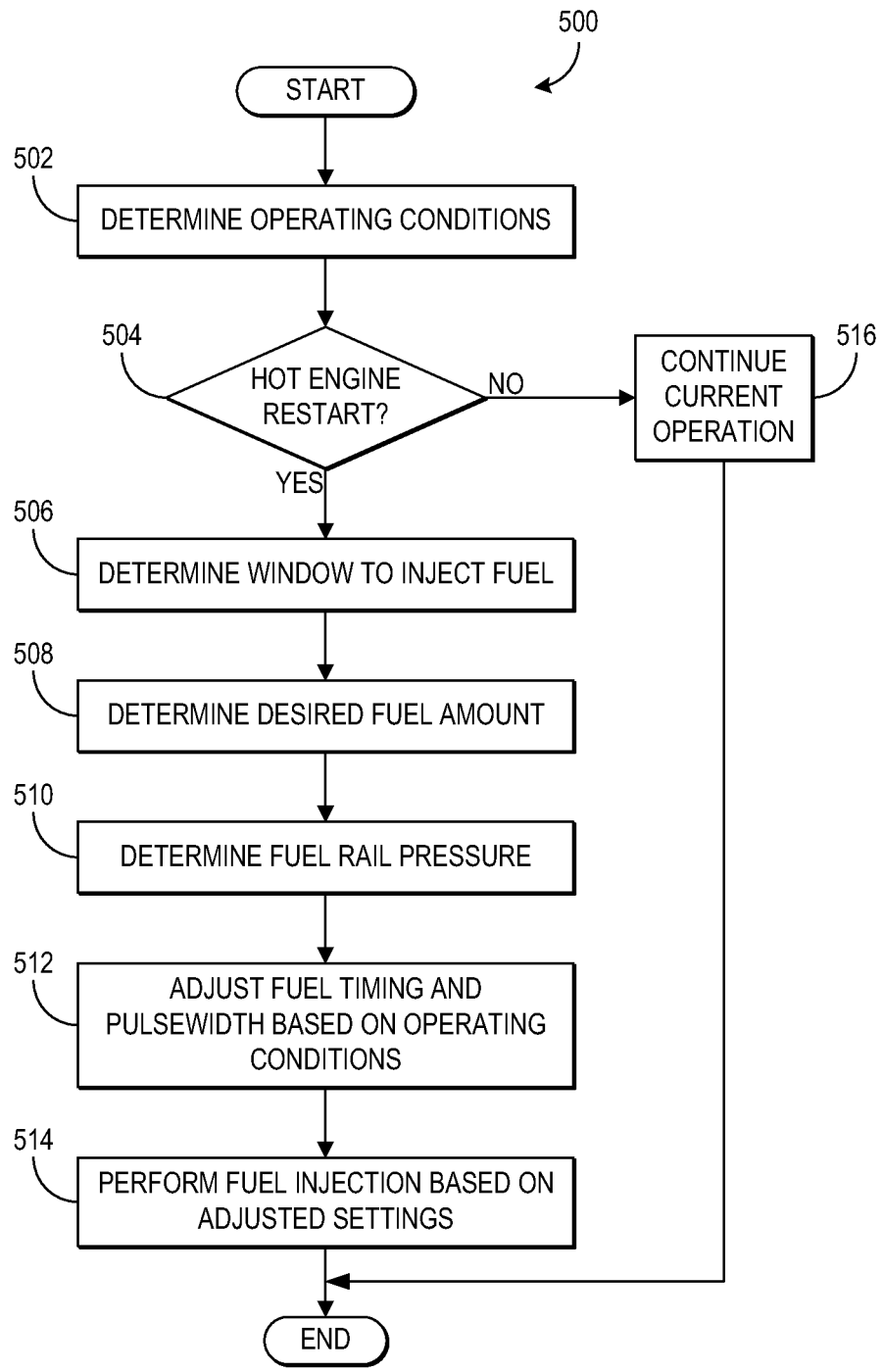
FIG. 5 shows a flow chart illustrating a routine for controlling fuel injection to an engine during a hot engine restart.
Figure 6:
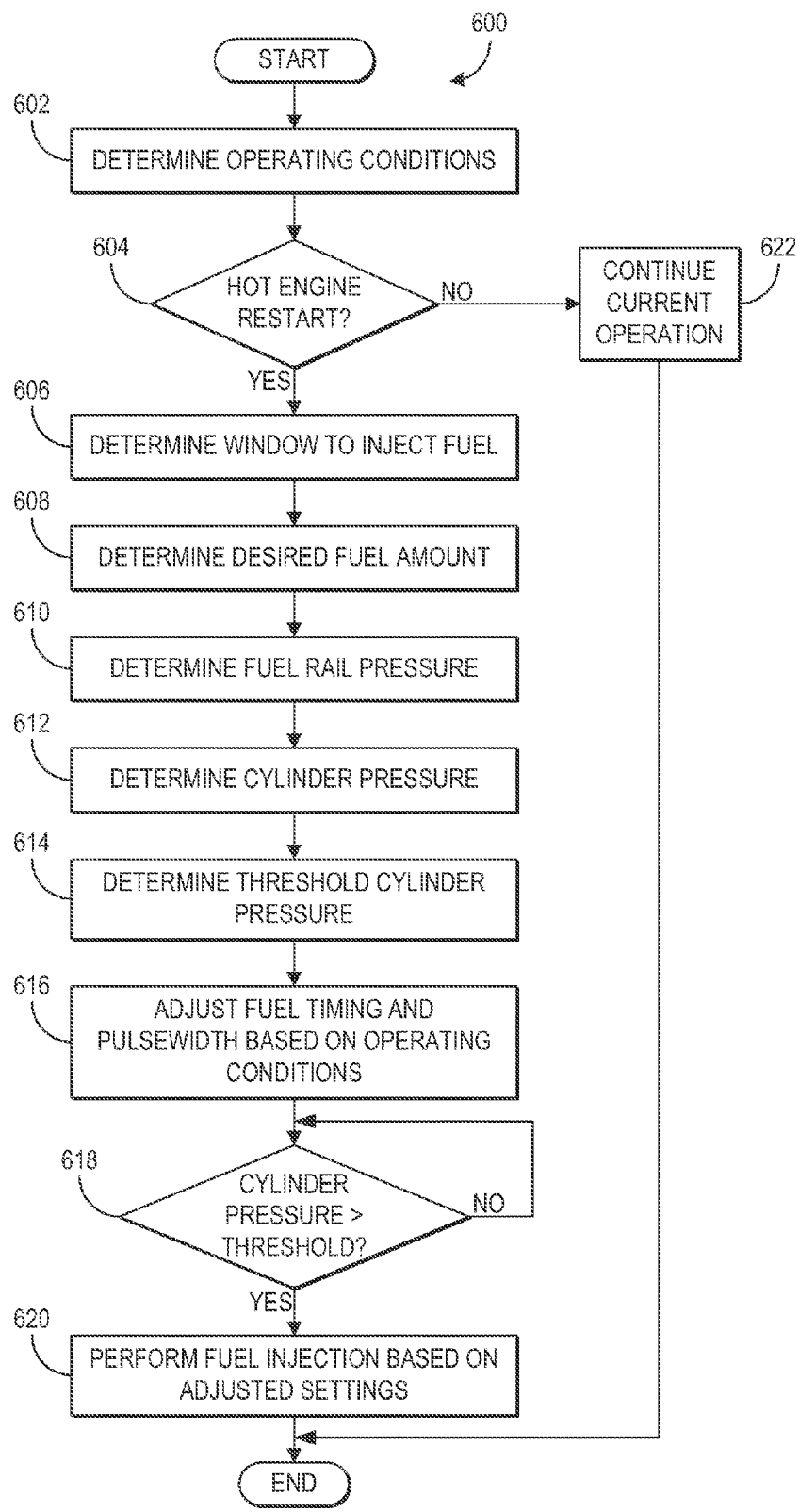
FIG. 6 shows a flow chart illustrating a routine for controlling fuel injection to an engine during a hot engine restart.

FIG. 3 shows a series of timing charts illustrating fuel injection during various conditions relative to cylinder pressure and piston position. FIGS. 4-6 show flow charts illustrating control routines for injecting fuel into a cylinder of an engine, such as combustion chamber 30 of engine 10 described above with reference to FIGS. 1 and 2, during various conditions shown in FIG. 3. For example, FIG. 4 shows a routine for determining fuel injection timing and pulsewidth under a cold start condition, FIG. 5 shows a routine for determining fuel injection timing and pulsewidth under a hot engine restart condition, and FIG. 6 shows a routine for determining fuel injection timing and pulsewidth based on cylinder pressure under a hot engine restart condition.

As stated above, FIG. 3 shows a series of graphs illustrating piston position, cylinder pressure, and fuel injection over time. In this example, fuel injection under various conditions is illustrated such that its relationship to cylinder pressure and piston position is shown.

Curve 302 shows piston position during an intake stroke and a compression stroke of an engine cycle for the cylinder. For example, at time $t_3$, the piston reaches bottom dead center (BDC), and the intake stroke ends and the compression stroke begins. Curve 304 shows the corresponding pressure in the cylinder during the intake and compression strokes. For example, during the intake stroke, the intake valve opens allowing charge air to enter the cylinder and a volume of the combustion chamber increases as the piston approaches BTC at time $t_3$. As a result, pressure in the cylinder drops. On the other hand, during the compression stroke, pressure in the cylinder increases as the intake valve closes and the volume of the combustion chamber decreases as the piston approaches top dead center (TDC) at time $t_6$. Curve 304 is shown as an example of pressure in the cylinder and may indicate an average pressure in the cylinder. For example, during a cold start condition, the pressure in the cylinder may be greater during the intake stroke than indicated by curve 304 and during a hot engine restart, the pressure in the cylinder may be less than indicated by curve 304.

Further, fuel injections A, B, and C are illustrated in FIG. 3, each corresponding to a different condition. Fuel injection A corresponds to fuel injection during a cold engine start. A cold engine start may include conditions such as coolant temperature less than a threshold temperature and engine off immediately prior to start for greater than a threshold duration, for example. As shown, during the cold engine start, fuel injection may occur in window 306 between time $t_1$ and time $t_5$, where the earliest fuel injector opening time is $t_1$ and the latest fuel injector closing time is $t_5$. The window for fuel injection (e.g., window 306) may be determined based on conditions such as ambient temperature and pressure and fuel rail pressure, for example.

Fuel injection B corresponds to fuel injection during a hot engine restart. A hot engine restart may include conditions such as coolant temperature greater than a threshold temperature and engine off immediately prior to start for less than a threshold duration, for example. As shown, during the hot engine restart, fuel injection may occur in window 310 between time $t_2$ and time $t_5$, where the earliest fuel injector opening time is $t_2$ and the latest fuel injector closing time is $t_5$. As described above, the window for fuel injection (e.g., window 310) may be determined based on conditions such as ambient temperature and pressure and fuel rail pressure, for example. During a hot engine restart, fuel rail pressure may be higher than during a cold engine start, as such, the start of the fuel injection window may be retarded with respect to the cold start condition. For example, due to the high pressure fuel in the fuel rail and the relatively low pressure in the combustion chamber during the intake stroke, a flow rate of fuel from the fuel rail to the combustion chamber may be higher during a hot engine restart than during a cold engine start. Thus, the fuel injection window may be delayed during a hot engine restart such that fuel injection amount (e.g., pulsewidth) may be better controlled. However, even when the fuel injection window is delayed, in some examples, a higher than requested amount of fuel may be delivered to the cylinder due the higher pressure in the fuel rail and the increased flow rate of fuel to the combustion chamber. As shown in FIG. 3, window 310 corresponding to fuel injection B begins at time $t_2$, which is later than time $t_1$ at which window 308 corresponding to fuel injection A starts.

Further, in the example depicted in FIG. 2, fuel injection A is shown at 308 and fuel injection B is shown at 312. As shown, fuel injection B has a much shorter duration (e.g., pulsewidth) than fuel injection A. As described above, this is due to the higher pressure in the fuel rail during a hot engine restart as compared to a cold engine start resulting in a higher fuel flow rate from the fuel rail to the combustion chamber when the injector is open. Thus, a greater amount of fuel flows into the combustion chamber in a shorter amount of time.

Fuel injection C corresponds to fuel injection based on a cylinder pressure during a hot engine restart. As shown, during the hot engine restart, fuel injection may occur in window 314 between times $t_4$ and time $t_5$, where the earliest fuel injector opening time is $t_4$ and the latest fuel injector closing time is $t_5$. The window for fuel injection (e.g., window 314) may be determined based on conditions such as ambient temperature and pressure, fuel rail pressure, and, in this example, cylinder pressure. As described above, during a hot engine restart, fuel rail pressure may be higher than during a cold engine start, and as such, the start of the fuel injection window may be retarded with respect to the cold start condition. By monitoring the cylinder pressure, a time at which a threshold pressure occurs may be determined, and fuel injection may be scheduled to occur only after the threshold cylinder pressure is reached. In this manner, a longer fuel pulsewidth may be delivered to the cylinder such that the amount of fuel delivered to the cylinder is better controlled. For example, fuel injection C is shown at 316. Fuel injection C has a longer duration than fuel injection B, as fuel injection C starts at a later time than fuel injection B when the cylinder pressure is greater.

Thus, as will be described in greater detail below, in one embodiment, a method of operating an engine during a hot engine restart comprises estimating a fuel rail pressure and estimating a cylinder pressure in a cylinder of the engine. The method further comprises scheduling fuel injection timing to directly inject fuel to the cylinder only when the cylinder pressure is greater than a threshold cylinder pressure, the threshold cylinder pressure based on the fuel rail pressure. Injection timing may include injector opening time, injector closing time, as well as average injection time, for example.

FIG. 4 shows a flow chart illustrating a routine 400 for controlling fuel injection to a cylinder of an engine during a cold engine start. As an example, routine 400 may correspond to fuel injection A illustrated in FIG. 3 and described above.

At 402 of routine 400, engine operating conditions are determined. Operating conditions may include coolant temperature, ambient temperature and pressure (e.g., barometric pressure), air-fuel ratio, and the like.

Once the operating conditions are determined, it is determined if the engine is under a cold start at 404. As an example, it may be determined that the engine is under cold start conditions if the coolant temperature is less than a threshold temperature and/or if a duration the engine was shut down for immediately prior to starting is greater than a threshold duration. Further, engine start may be determined if the engine is cranking or idling for a duration less than a threshold duration. If it is determined the engine is not under cold start conditions, the routine moves to 416 and current operation is continued.

On the other hand, if it is determined that the engine is under a cold start, routine 400 proceeds to 406 where ambient temperature and pressure are determined. For example, during a cold engine start before the engine has warmed-up, a temperature and pressure in the intake manifold may be close to ambient pressure. As such, a cylinder pressure may be greater by an amount corresponding to the ambient temperature and pressure during an intake stroke under cold start operation than during warmed-up engine operation.

At 408, the routine determines a window to inject fuel. The fuel injection window may be determined based on parameters such as desired air-fuel ratio, air and fuel mixing in the cylinder, intake valve timing, and the like. Once the fuel injection window is determined, routine 400 continues to 410 where a fuel injection amount is determined. The fuel injection amount may be determined based on desired air fuel ratio, cam timing, and the like.

Once the fuel injection window and fuel injection amount are determined, routine 400 proceeds to 412 where the fuel injection timing and pulsewidth are adjusted based on the operating conditions. For example, based on the ambient pressure during a cold start, fuel may be injected as early as possible when the ambient pressure is higher due to a smaller pressure difference between the fuel rail and the combustion chamber. In this manner, the fuel may have a maximum amount of time to mix with intake air before combustion occurs. Further, the pulsewidth may be adjusted to be longer or shorter depending on the ambient temperature and pressure and the time at which the injection begins. In some examples, the fuel injection may be adjusted such that the fuel injection is divided and fuel is injected to the cylinder a plurality of times (e.g., 2 injection events, 3 injection events, 4 injection events, etc.) in a single combustion cycle. In such an example, the total desired amount of fuel to be injected to the engine may be divided over the multiple injection events such that the pulsewidth for each injection event during the combustion cycle is reduced. Then, at 414 of routine 400, fuel injection is performed at the adjusted timing and pulsewidth.

Thus, fuel injection timing and pulsewidth may be scheduled based on ambient conditions while the engine is warming-up. In this manner, fuel injection may be scheduled such that efficient engine operation occurs during cold start conditions.

Continuing to FIG. 5, a flow chart illustrating a routine 500 for controlling fuel injection to a cylinder of an engine during a hot engine restart is shown. As an example, routine 500 may correspond to fuel injection B illustrated in FIG. 3 and described above.

At 502 of routine 500, engine operating conditions are determined. Operating conditions may include coolant temperature, ambient temperature and pressure (e.g., barometric pressure), air-fuel ratio, and the like.

Once the operating conditions are determined, routine 500 proceeds to 504 where it is determined if the engine is under a hot restart. It may be determined that the engine is under a hot restart if the coolant temperature is greater than a threshold temperature and/or if a duration of engine shutdown immediately preceding the start-up is less than a threshold duration, for example. Further, engine start may be determined if the engine is cranking or idling for a duration less than a threshold duration. If it is determined that the engine is not under a hot restart, routine 500 moves to 516 where current operation is continued.

On the other hand, if it is determined that the engine is under a hot restart, routine 500 continues to 506 where a window to inject fuel is determined. The fuel injection window may be determined based on parameters such as desired air-fuel ratio, air and fuel mixing in the cylinder, intake valve timing, and the like. Once the fuel injection window is determined, routine 500 continues to 508 where a fuel injection amount is determined. The fuel injection amount may be determined based on desired air fuel ratio, cam timing, and the like.

At 510, fuel rail pressure is determined. Fuel rail pressure may be measured by a pressure sensor disposed in the fuel rail and in communication with a controller, for example. As described above, during a hot engine restart, pressure in the fuel rail may be higher than during a cold engine start. Due to a higher pressure difference between the combustion chamber and the fuel rail, fuel may flow to the cylinder at a higher rate. As such, fuel injection timing (e.g., start of injection, end of injection, and/or average injection time) may be delayed.

Once pressure in the fuel rail is determined, fuel injection timing and pulsewidth are adjusted based on operating conditions at 512. As an example, injector opening timing, injector closing timing, and/or average duration injector is open may be adjusted responsive to the operating conditions. For example, due to the higher pressure in the fuel rail during the hot engine restart, fuel injection may begin (e.g., injector opening time) at a later time than during a cold engine start. Further, due to the higher pressure difference between the fuel rail and the combustion chamber, the pulsewidth may have a shorter duration than during a cold engine start, as shown by fuel injection B in FIG. 3. In some examples, the fuel injection may be adjusted such that the fuel injection is divided and fuel is injected to the cylinder a plurality of times (e.g., 2 injection events, 3 injection events, 4 injection events, etc.) in a single combustion cycle. In such an example, the total desired amount of fuel to be injected to the engine may be divided over the multiple injection events such that the pulsewidth for each injection event during the combustion cycle is reduced. Then, at 514 of routine 500, fuel injection is performed at the adjusted timing and pulsewidth.

In this manner, fuel injection may be scheduled during a hot engine restart such that a desired air-fuel ratio is maintained, for example. However, due to the high pressure in the fuel rail, the pulsewidth may be relatively short, thereby increasing a need for precise injector control where modulation of the pulsewidth is desired for air-fuel ratio control. In some examples, the desired pulsewidth may be less than a minimum, or threshold, pulsewidth. Thus, fuel injection may be scheduled based on the cylinder pressure, as will be described in greater detail below with reference to FIG. 6.

Continuing to FIG. 6, a flowchart illustrating a routine 600 for controlling fuel injection to a cylinder of an engine based on cylinder pressure during a hot engine restart is shown. As an example, routine 600 may correspond to fuel injection C illustrated in FIG. 3 and described above.

At 602 of routine 600, engine operating conditions are determined. Operating conditions may include coolant temperature, ambient temperature and pressure (e.g., barometric pressure), air-fuel ratio, and the like.

Once the operating conditions are determined, routine 600 proceeds to 604 where it is determined if the engine is under a hot restart. As described above, it may be determined that the engine is under a hot restart if the coolant temperature is greater than a threshold temperature and/or if a duration of engine shutdown immediately preceding the start-up is less than a threshold duration, for example. Further, engine start may be determined if the engine is cranking or idling for a duration less than a threshold duration. If it is determined that the engine is not under a hot restart, routine 600 moves to 622 where current operation is continued.

On the other hand, if it is determined that the engine is under a hot restart, routine 600 proceeds to 606 where the routine determines a window to inject fuel. The fuel injection window may be determined based on parameters such as desired air-fuel ratio, air and fuel mixing in the cylinder, intake valve timing, and the like, as described above. Once the fuel injection window is determined, routine 600 continues to 608 where a fuel injection amount is determined. The fuel injection amount may be determined based on desired air fuel ratio, cam timing, and the like.

At 610, fuel rail pressure is determined. Fuel rail pressure may be measured by a pressure sensor disposed in the fuel rail and in communication with a controller, for example. As described above, during a hot engine restart, pressure in the fuel rail may be higher than during a cold engine start resulting in a higher pressure difference between the combustion chamber and the fuel rail. As such, the fuel flow rate from the fuel rail to the combustion chamber may be increased, and injection timing (e.g., start of injection and/or end of injection) may be retarded.

At 612, cylinder pressure is determined. In one example, cylinder pressure may be estimated by calculating it according to a polytropic equation of state such as:

$$P_2 = \left(\frac{V_1}{V_2}\right)^\gamma P_1,$$

where $P_2$ is the in-cylinder pressure, $V_2$ is the volume in the cylinder as determined by crankshaft angle, and $P_1$, $V_1$, and $\gamma$ are determined through testing. In another example, cylinder pressure may be estimated based on a look-up table stored in the engine controller software. For example, cylinder pressures during a compression stroke of the engine may be measured, and the cylinder pressures may be fit to a curve as function of crank position (e.g., cam timing) and the equation and/or coefficients may be stored as the look-up table.

Once the cylinder pressure is estimated, a threshold cylinder pressure is determined at 614. The threshold cylinder pressure may be a minimum cylinder pressure for fuel injection to begin. For example, above the threshold cylinder pressure, a longer base pulsewidth may be employed such that there is a greater margin for pulsewidth modulation for emission control and air-fuel ratio may be maintained. The threshold cylinder pressure may be determined responsive to the measured fuel rail pressure. For example, the threshold cylinder pressure may be a cylinder pressure needed to offset the fuel rail pressure during the hot engine restart compared to fuel rail pressure during cold start conditions. As such, the threshold cylinder pressure may increase as the fuel rail pressure increases. In some examples, the threshold cylinder pressure may be determined, at least in part, based on a minimum fuel injection amount. For example, the system may have a minimum fuel injection amount which may be exceeded in a particular crank angle range when the fuel rail pressure is relatively high. In such an example, the opening to closing timing of the fuel injection may be retarded to a crank angle duration over which the cylinder pressure is greater than the threshold pressure such that an amount of fuel which is greater than the minimum fuel injection amount may be delivered to the combustion chamber.

At 616 of routine 600, fuel injection timing and pulsewidth are adjusted based on operating conditions. For example, fuel injector opening and closing timing may be retarded compared to a cold start condition (FIG. 4) or a hot restart condition where fuel injection is not determined based on the cylinder pressure (FIG. 5). During a hot engine restart, the fuel injection timing may be adjusted responsive to the cylinder pressure by maintaining the fuel injector open only when the cylinder pressure is greater than the threshold cylinder pressure, for example. Further, the fuel pulsewidth may be increased (e.g., the duration the injector is open) due to the later injection start time and the smaller difference between the cylinder pressure and the fuel rail pressure. In one example, the fuel injection may be scheduled to occur completely during the compression stroke. Further, the fuel injection may be scheduled such that the injector is only open when the cylinder pressure is greater than the threshold cylinder pressure. In other words, the fuel injection timing of the cylinder may be adjusted such that for an entire duration the fuel injector is open, the cylinder pressure is greater than the threshold cylinder pressure. Further still, in some examples, the fuel injection may be adjusted such that the fuel injection is divided and fuel is injected to the cylinder a plurality of times (e.g., 2 injection events, 3 injection events, 4 injection events, etc.) in a single combustion cycle. In such an example, the total desired amount of fuel to be injected to the engine may be divided over the multiple injection events such that the pulsewidth for each injection event during the combustion cycle is reduced.

At 618, it is determined if the cylinder pressure is greater than the threshold pressure. If the cylinder pressure is not greater than the threshold pressure, the routine waits until the cylinder pressure is greater than threshold cylinder pressure. Once the cylinder pressure is greater than the threshold cylinder pressure, routine 600 proceeds to 620 where fuel injection is performed according to the adjusted settings.

Thus, fuel injection may be controlled during a hot engine restart such that the fuel injector is only open when the cylinder pressure is greater than a threshold pressure. As described above, the threshold pressure may be adjusted responsive to the fuel rail pressure. For example, as the fuel rail pressure increases, the threshold pressure increases. In this manner, fuel injection may occur when a pressure difference between the combustion chamber and the fuel rail is smaller such that a longer pulsewidth may be used and modulation of the pulsewidth may be carried out more easily carried out for air-fuel ratio control.

Figure 7:
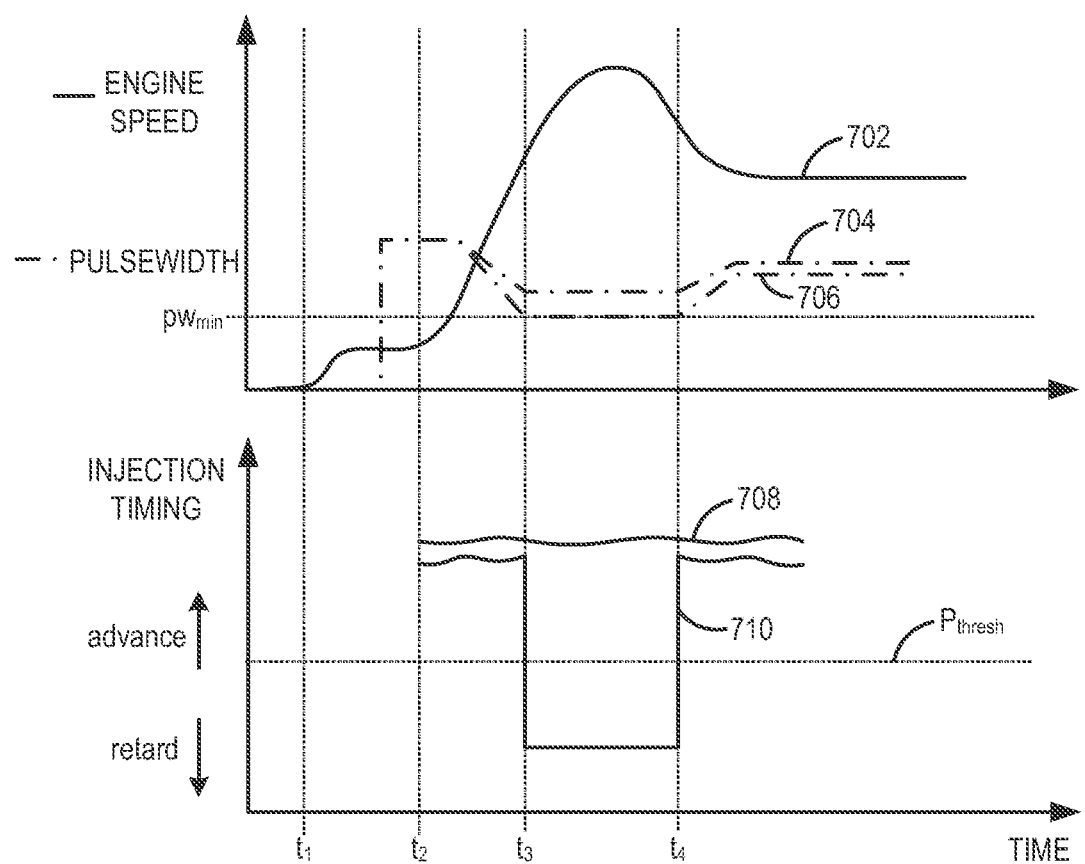
FIG. 7 shows timing charts illustrating fuel injection timing with respect to engine speed and fuel pulsewidth.

FIG. 7 shows a series of timing charts illustrating examples of engine speed, fuel pulsewidth, and fuel injection timing for a cold start condition and a hot restart condition. In the example of FIG. 7, the engine is at rest before time $t_1$ and engine cranking occurs at time $t_1$.

After engine cranking occurs, the fuel pulsewidth increases such that the first combustion can occur at time $t_2$. As the engine speed (RPM) 702 increases, the desired fuel pulsewidth may be reduced in order to decrease engine torque, for example. Under the cold start indicated by curve 704, the fuel pulsewidth remains above the minimum fuel pulsewidth ($pw_{min}$). As such, the injection timing during the cold start, indicated by curve 708, may remain advanced from the condition when the cylinder pressure reaches the threshold cylinder pressure ($P_{thresh}$). Under the hot restart, however, the fuel pulsewidth drops below the minimum fuel pulsewidth between times $t_3$ and $t_4$. As such, the fuel injection timing is retarded between times $t_3$ and $t_4$, such that fuel injection occurs at a higher cylinder pressure, as indicated by curve 710. Thus, because the cylinder pressure is higher, the same amount of fuel can be injected over a longer pulsewidth such that the pulsewidth is at least the minimum pulsewidth, as indicated by curve 706.

In this manner, it is possible to take advantage of the compression generated by the piston during the compression stroke to counteract the effects of the minimum opening time (e.g., pulsewidth) of the injector during a hot engine restart.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine, comprising:
   measuring a fuel rail pressure,
   determining a threshold cylinder pressure based on the fuel rail pressure,
   during a hot engine restart, adjusting fuel injection timing into an engine cylinder such that for an entire duration a fuel injector is open, cylinder pressure is greater than the threshold cylinder pressure, and
   during a cold engine start, adjusting fuel injection timing into the cylinder such that the injector is open at least when cylinder pressure is below the threshold cylinder pressure,
   wherein the determined threshold cylinder pressure is increased as the measured fuel rail pressure increases.

2. The method of claim 1, further comprising adjusting an injection pulsewidth based on the fuel rail pressure and the cylinder pressure.

3. The method of claim 1, wherein the hot engine restart includes when the engine is turned on after having been off for a threshold duration and coolant temperature is greater than a threshold temperature.

4. The method of claim 1, wherein the fuel injection timing includes a time the injector opens and a time the injector closes.

5. The method of claim 1, wherein the fuel injection timing includes an average time at which the fuel injector is open.

6. The method of claim 1, further comprising retarding opening to closing timing to a crank angle duration over which the cylinder pressure is greater than the threshold cylinder pressure.

7. The method of claim 1, further comprising injecting fuel directly to the engine cylinder a plurality of times during a combustion cycle.

8. An engine method, comprising:
   measuring a fuel rail pressure;
   adjusting a threshold cylinder pressure responsive to the fuel rail pressure, including increasing the threshold cylinder pressure responsive to an increase in the fuel rail pressure;
   during a hot engine restart, injecting fuel directly into a cylinder with an injector open only when cylinder pressure is above the threshold cylinder pressure, the threshold cylinder pressure adjusted responsive to fuel rail pressure;
   during a cold engine start, injecting fuel directly into the cylinder with the injector open at least when cylinder pressure is below the threshold cylinder pressure.

9. The method of claim 8, further comprising, during the hot engine restart, adjusting an injection pulsewidth based on the cylinder pressure and the fuel rail pressure.

10. The method of claim 8, wherein, during the hot engine restart, opening and closing timing of the fuel injection are retarded.

11. The method of claim 8, wherein during the cold engine start, fuel injection timing is based on an ambient temperature and an ambient pressure.

12. The method of claim 8, further comprising estimating the cylinder pressure based on a look-up table of predetermined values.

13. A system for an engine, comprising:
   a fuel system with a direct injector fluidically coupled between a fuel rail and a cylinder of the engine and configured to directly inject fuel into the cylinder; and
   a controller in communication with the direct injector and configured to identify a fuel rail pressure and a cylinder pressure of the cylinder and to control the direct injector to only inject fuel to the cylinder when the cylinder pressure is greater than a threshold cylinder pressure during a hot engine restart, the controller further configured to increase the threshold cylinder pressure responsive to an increase in the fuel rail pressure,
   wherein the controller is further configured to inject at least some fuel to the cylinder when the cylinder pressure is less than the threshold cylinder pressure during a cold engine start.

14. The system of claim 13, wherein the controller is configured to identify the cylinder pressure based on a polytropic equation of state.

15. The system of claim 13, wherein the controller is further configured to adjust an injection pulsewidth responsive to the cylinder pressure and the fuel rail pressure.

16. The system of claim 13, wherein the controller is further configured to retard opening and closing timings of the injector responsive to the threshold cylinder pressure during the hot engine restart.

17. The method of claim 1, wherein the determination of the threshold cylinder pressure is further based on a determined minimum cylinder pressure for fuel injection to begin.

18. The method of claim 1, wherein determining the threshold cylinder pressure based on the fuel rail pressure comprises determining the threshold cylinder pressure as a cylinder pressure needed to offset the fuel rail pressure during the hot engine restart compared to the fuel rail pressure during the cold engine start.

19. The method of claim 1, wherein the determination of the threshold cylinder pressure based on the fuel rail pressure is based on a minimum fuel injection amount which may be exceeded in a particular crank angle range.

20. The method of claim 1, further comprising determining the threshold cylinder pressure as a cylinder pressure needed to offset the fuel rail pressure during the hot engine restart compared to the fuel rail pressure during the cold engine start.

21. The system of claim 13, wherein the controller is further configured to determine the threshold cylinder pressure as a cylinder pressure needed to offset the fuel rail pressure during the hot engine restart compared to the fuel rail pressure during the cold engine start.

\* \* \* \* \*